Feb. 3, 1970  J. C. HOADLEY  3,493,760

OPTICAL ISOLATOR FOR ELECTRIC SIGNALS

Filed Dec. 14, 1966

INVENTOR,
JAMES CARLISLE HOADLEY
BY Harry M. Saragovitz
Edward J. Kelly, Herbert Berl
& J. D. Edgerton
ATTORNEYS

United States Patent Office 3,493,760
Patented Feb. 3, 1970

3,493,760
OPTICAL ISOLATOR FOR ELECTRIC SIGNALS
James Carlisle Hoadley, Rockville, Md., assignor to the United States of America as represented by the Secretary of the Army
Filed Dec. 14, 1966, Ser. No. 601,814
Int. Cl. H04b 9/00
U.S. Cl. 250—199       4 Claims

ABSTRACT OF THE DISCLOSURE

This disclosure describes a magnetically shielded instrumentation package such as those used for weapons effects tests in which cables for conducting electrical signals to circuitry within the shielded enclosure are replaced by an optical system. The electrical signal modulates a gallium arsenide light source and the light beam from the source is directed through apertures in the shielding to a light sensitive diode which reproduces the electrical signal for use by the instrumentation circuit within the shielded enclosure.

---

This invention relates to means for preserving the integrity of magnetic shielding while introducing a signal into an instrument so shielded, and, in particular, an optical means for accomplishing this result.

Frequently in testing operations in various environments it is necessary to surround the instrumentation with magnetic shielding, but the integrity of this shielding is often difficult to preserve when it is necessary to transmit signals from external transducers to the instrumentation within the shielded enclosure via cable which must penetrate the magnetic shielding. It has generally been found that by extending cable wires and/or shields through the shield wall spurious signals will be superimposed on the desired data signals. For example, typical weapons effects tests require that transducer signals be coupled to electronic instrumentation circuits located inside a magnetically shielded enclosure via shielded coaxial cables. These cables will be subjected to very large electomagnetic, gamma, and neutron fields associated with the close-in nuclear detonation environment; and electromagnetic pulse effects, Compton electrons ejected from the cable materials and large ground currents will generate spurious signals in the cable wires and shields which, if allowed to pass through the shielding would essentially negate the effectiveness of the magnetic shielding.

It is, therefore, an object of my invention to provide a means for the introduction of signals into a circuit enclosed by a magnetic shield without using electrically conductive elements thereby preventing spurious currents from entering the shielded enclosure.

Briefly, in accordance with the aforementioned object my invention contemplates coupling the signals from external sources to a modulated light source which may be either coherent or incoherent located near the outside surface of the magnetic shield. The modulated light beam is directed through a small aperture to a light sensitive element placed inside the magnetic shield, the electrical output of which may be connected to the circuit which is to utilize the signal from the external source.

The specific nature of the invention as well as other objects, aspects, uses and advantages thereof will clearly appear from the following description and from the accompanying drawing, in which.

Figure 1:
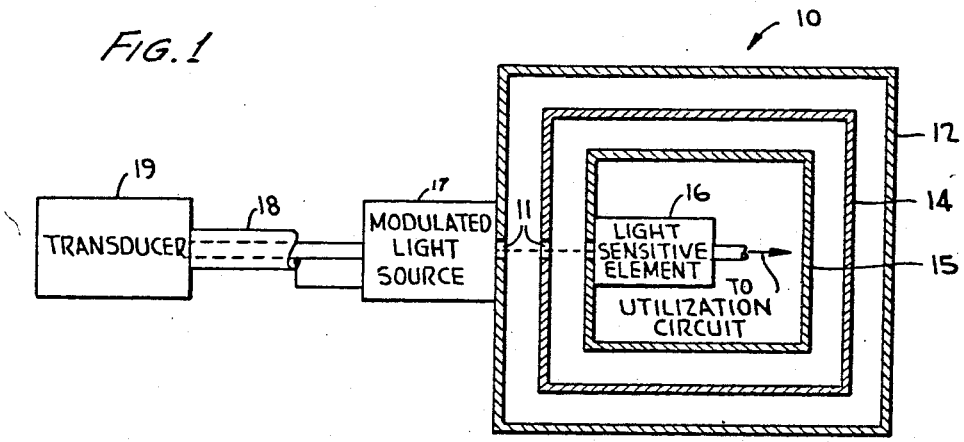
FIGURE 1 is a cross-sectional view of a typical embodiment of my invention.

As shown in FIGURE 1 a typical magnetically shielded instrumentation package consists of an outer shield 12, inner shield 14 and the utilization circuit 15, such as an electric recording system. This embodiment of my invention contemplates providing small apertures 11 in both the outer shield 12 and the inner shield 14 so that a light beam may be directed through said shields.

Transducer 19 provides information for utilization circuit 15 by means of signals conducted by shielded coaxial cable 18. However, by using my invention instead of extending cable 18 through the shielded enclosure it is connected to a modulated light source 17. In this embodiment the light source used is Gallium Arsenide which is a very small source, extremely linear, and capable of bandwidths in the megacycle region. The signal on cable 18 modulates light source 17 the output of which is beamed through apertures 11 to light sensitive element 16 which in this embodiment is a light sensitive diode. The information on the light beam is converted by the light sensitive element 16 to electrical energy for utilization circuit 15 which might be an electronic recording system. By using this means of transmitting a signal through magnetic shielding it is necessary only to puncture small holes in the shielding for use by the light beam. The small apertures will act as a waveguide below cutoff for all frequencies generally found in spurious signals and are therefore not considered significant leak points in the magnetic shielding. As discussed earlier, my invention eliminates the need for an electrical connection through the magnetic shielding thereby isolating the shielded electronic circuits and/or the shields from the large currents associated with the outer surface of the outer shield.

Figure 2:
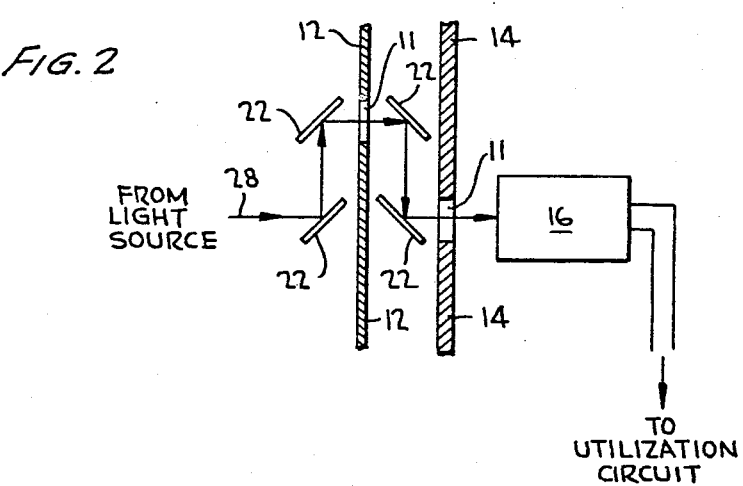
FIGURE 2 is a cross-sectional view of an alternate means of providing an aperture in the magnetic shielding while providing better shielding.

Although the apertures in the shields have been found not to materially affect the integrity of the shielding, as illustrated in FIGURE 2, it is possible to obtain even greater isolation by staggering the apertures in the outer and inner shields, respectively, and deflecting the light beam accordingly. In the portion of the alternate embodiment of FIGURE 1 shown in FIGURE 2 only that part of the inner shield 14 and outer shield 12 necessary to show aperture placement are illustrated. As is evident, apertures 11 in shields 12 and 14 are staggered, and the light beam 28 is transmitted to the light sensitive element 16 for utilization as described with respect to FIGURE 1 through apertures 11 by deflecting light beam 28 with mirrors 22.

It will be evident to those skilled in the art that other media for the transmission of light, for example lens systems, electrically conductive glass windows, magnetic metal mesh, prisms or fiber optics, can be used to achieve the advantageous results obtained by my invention.

Although the optical isolator of my invention has been described in the context of a nuclear weapons testing system, its use is not limited to such applications, and it may be applied in any shielded environment. A further advantage that will become apparent to those skilled in the art upon using my invention is that in monitoring high frequency, high impedances points much of the loading caused by high capacity, low impedance coaxial cables connecting the circuits under test to the monitoring circuit can be eliminated.

It will be apparent that the embodiments of my invention shown are only exemplary and that various modification can be made in construction and arrangement within the scope of the invention as defined in the appended claims.

I claim as my invention:

1. A system for transmitting a signal from a remote point without transmitting spurious signals which are picked up by the transmitting cable, comprising:
  (a) a transducer for producing electrical signals in response to external stimuli;

(b) a coxial cable for transmitting said electrical signals;
(c) a utilization circuit responsive to signals carried by said coaxial cable;
(d) magnetic shielding surrounding said utilization circuit; and
(e) means to isolate said magnetic shielding from said coaxial cable.

2. The system of claim 1 wherein said means to isolate comprises:
(a) a light source electrically connected to said coaxial cable and located outside said magnetic shielding and immediately adjacent thereto; said light source being modulated by said electrical signals;
(b) a light sensitive element for converting light signals to electrical signals located within said magnetic shielding and electrically connected to said utilization circuit; and
(c) an aperture in said magnetic shielding for transmitting a light beam from said light source to said light sensitive element.

3. The system of claim 1 wherein said magnetic shielding comprises a plurality of overlapping shields each containing an aperture, said apertures being staggered to prevent a straight light beam from passing between said light source and said light sensitive element, and reflecting means located between said shields for directing said light through each of said apertures.

4. The system of claim 2 wherein said light source is gallium arsenide.

References Cited

UNITED STATES PATENTS

| | | | |
|---|---|---|---|
| 2,670,649 | 3/1954 | Robinson | 250—217 |
| 2,797,336 | 6/1957 | Loft | 250—217 |
| 3,103,585 | 9/1963 | Johnson | 250—199 |
| 3,227,877 | 1/1966 | Dreyfus | 250—199 |
| 3,041,916 | 7/1962 | Clave et al. | 250—108 |
| 3,228,337 | 1/1966 | Grantham et al. | 250—199 XR |

OTHER REFERENCES

Theory of a Nested Shield, Audio Cyclopedia, April 1959, Library of Congress Catalog No. 58–14290.

Carbone, R. J. et al.: IEEE Proc, Output Power from GaAs Lasers at Room Temp., 1964, p. 717.

ROBERT L. GRIFFIN, Primary Examiner

ALBERT J. MAYER, Assistant Examiner

U.S. Cl. X.R.

250—108